United States Patent [19]

Johnson

[11] 4,022,751

[45] May 10, 1977

[54] STABILIZATION OF HIGH TEMPERATURE PLASTICS CONTAINING ARYL-METHYLENE ARYLENE GROUPS AGAINST THERMAL OXIDATIVE DEGRADATION

[75] Inventor: Burnett H. Johnson, Baytown, Tex.

[73] Assignee: Exxon Research and Engineering Company, Linden, N.J.

[22] Filed: Mar. 13, 1975

[21] Appl. No.: 558,178

[52] U.S. Cl. ............... 260/45.75 C; 260/45.75 N; 260/45.95 H; 260/45.75 M

[51] Int. Cl.² .................... C08K 5/09; C08K 3/16; C08K 3/10

[58] Field of Search ............ 260/45.95 H, 45.75 N, 260/45.75 C, 45.75 M, 77.5 CH, 77.5 C

[56] References Cited

UNITED STATES PATENTS

| | | | |
|---|---|---|---|
| 3,073,785 | 1/1963 | Angelo | 260/78 TP |
| 3,277,043 | 10/1966 | Holub | 260/78 TF |
| 3,547,897 | 12/1970 | Patton | 260/77.5 |
| 3,591,562 | 7/1971 | Patton | 260/77.5 |
| 3,616,200 | 10/1971 | Reibach | 260/45.75 |
| 3,635,905 | 1/1972 | Patton | 260/77.5 |
| 3,642,524 | 2/1972 | Merten et al. | 260/77.5 CH |
| 3,661,859 | 5/1972 | Patton | 260/2.5 |
| 3,901,847 | 8/1975 | Johnson | 260/45.7 P |

*Primary Examiner*—V. P. Hoke
*Attorney, Agent, or Firm*—David A. Roth; Ben C. Cadenhead

[57] ABSTRACT

High temperature resistant polymers containing a methylene monoarylene, methylene diarylene, -aromatic ring—$CH_2$— or -aromatic ring—$CH_2$—aromatic ring-group are made more effective at even higher temperatures against thermal oxidative degradation by incorporating small quantities of special antioxidant stabilizers therein either singly or in combination to result in novel and unobvious compositions.

17 Claims, 7 Drawing Figures

Figure 2:
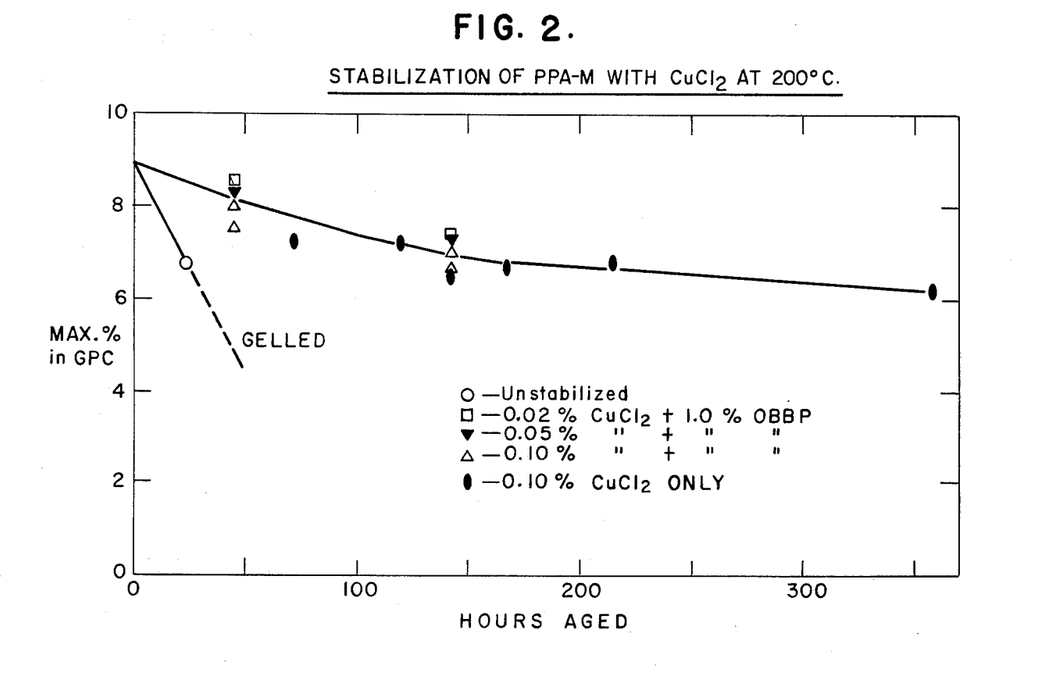

FIG. 2.
STABILIZATION OF PPA-M WITH CuCl₂ AT 200° C.

Figure 3:
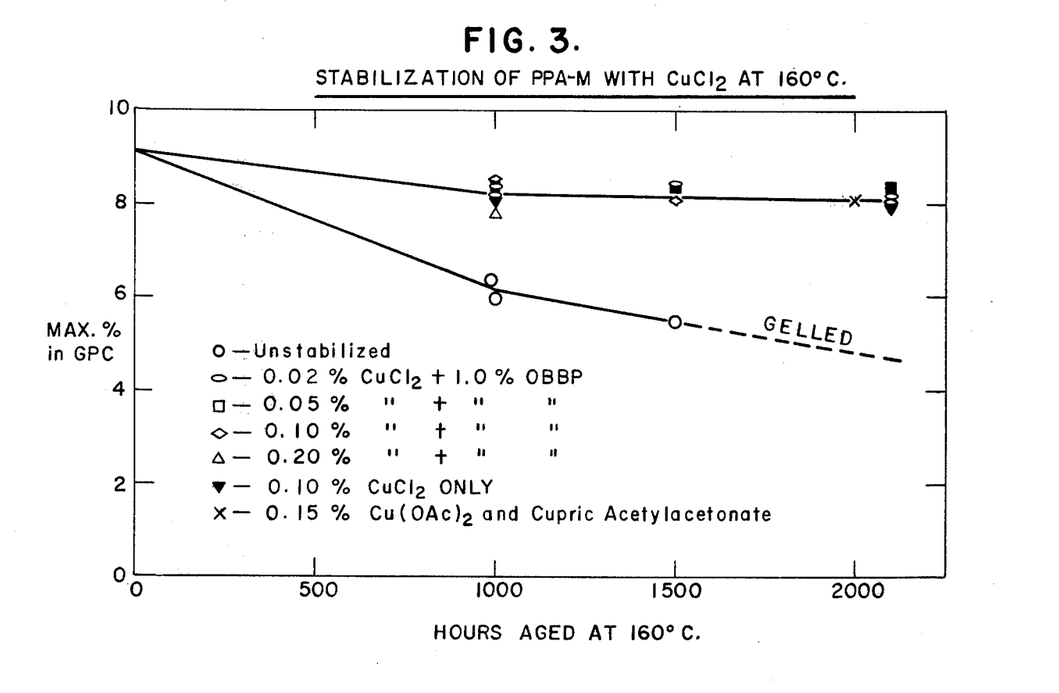

FIG. 3.
STABILIZATION OF PPA-M WITH CuCl₂ AT 160° C.

FIG. 4.

STABILIZATION OF HIGH TEMPERATURE PLASTICS CONTAINING ARYL-METHYLENE ARYLENE GROUPS AGAINST THERMAL OXIDATIVE DEGRADATION

CROSS-REFERENCE TO RELATED APPLICATIONS

This application is not formally related to any previous applications. However, it is an improvement of polymeric compositions which have been previously disclosed in pending applications and issued patents.

BACKGROUND OF THE INVENTION

A new class of polymers has come into existence in the last few years which are usually referred to as high performance thermoplastics. Generally, the concept of high performance always contemplates a polymer which has high heat resistance characteristics. Usually such a polymer will also possess excellent mechanical and electrical properties over a wide temperature range and is stable at elevated temperatures for extended periods of time. Generally, but not always, this class of polymers is soluble in a relatively small number of solvents and also has unusually excellent properties at very low temperatures.

As a general proposition, although not always, such polymers contain ring structures which are responsible for their high performance characteristics. Such rings comprise one or more of aromatic rings, the imide rings, the parabanic acid ring, and other heterocyclic rings usually containing carbon, nitrogen and oxygen therein. Although all such rings are relatively stable to high temperatures, the aromatic rings are relatively more so than heterocyclic rings.

In many instances, these ring-containing polymers also contain connecting linkages with varying degrees of stability. If the connecting linkage is considerably less resistant to adverse conditions than the ring components themselves, then the polymer will undergo degradation comprising either thermal oxidative chain scission or cross-linking reactions, or a combination of all at temperatures and under conditions far less severe than the ring itself is capable of withstanding.

In such event, the classic trite statement to the effect that the chain is no stronger than its weakest link is fully applicable. Therefore, it would be highly advantageous if techniques, compositions, and additives were developed which would enable one to overcome the effect of a particularly weak link in an otherwise very high performance polymer chain.

A very good example of such a weak link is the methylene group (—CH$_2$—) attached to at least one aromatic ring which is in a great number of polymers and is known to oxidize readily at relatively low temperatures. For the purpose of this application, a methylene linkage attached to one aromatic ring will be referred to as a methylene monoarylene group and if attached to two aromatic rings will be referred to herein as methylene diarylene. Such groups will be referred to generically herein as "arylmethylene."

In contrast, a linkage which appears in many high performance polymers is the diaryl ether linkage (aromatic ring-O-aromatic ring). It is not nearly as unstable as the arylmethylene group, but the polymer precursors in which it appears are considerably more expensive than the precursors in which the arylmethylene group appears.

Thus, it would be most desirable to utilize the relatively inexpensive arylmethylene-containing polymer precursors which are widely available with modest stabilization expenses, rather than to utilize the relatively expensive diaryl ether-containing precursor, even though the latter is known to result in a quite stable high performance polymer.

SUMMARY OF THE INVENTION

The essence of this invention is the discovery of how to efficiently and conveniently prevent relatively low temperature degradation of high performance plastics containing arylmethylene groups, by incorporating into such polymers very low quantities of one or more highly specific additives which have not hitherto been known to have activity in this regard to obtain unobvious novel highly useful compositions of matter.

DESCRIPTION OF THE PREFERRED EMBODIMENTS

The invention is applicable to any high performance polymer containing arylmethylene groups which can also contain heterocyclic rings with methylene connecting units, e.g., arylmethylene repeating units with or without repeating heterocyclic rings. For purposes of illustration, but not for exclusion, the invention will be described in specific with respect to a particular polymer. That is, a polyparabanic acid prepared from a diphenyl methane di-isocyanate in accordance with a proprietary technique well described in the patent literature in patents assigned to Exxon Research and Engineering Company to result in a high performance polymer (PPA-M) having the repeating unit shown below:

PPA—M,

For purposes of convenience, this PPA species is referred to as PPA-M. it will be recognized that other PPA species can be produced from other precursors. However, the diphenyl methane structure is a very common precursor either as the di-isocyanate or as the di-amine, e.g., methylene dianiline.

Typical examples of patents which describe polyparabanic acid compositions and their preparation include U.S. Pat. Nos. 3,661,859, 3,635,905, 3,547,897 and 3,591,562 which are hereby incorporated by reference in their entirety. Some commercial polymers which contain a methylene diarylene group and fit within the class of high performance polymers are polyimide 2080 from Upjohn, polyimide XPI-182 from American Cyanamid, P13N developed by TRW and Ciba-Geigy, Kinel, Kermid and Kemid from Rhone-Poulenc, General Electric and Chemplast, Amoco's AI-10, AI-11 and Torlon. These examples are simply to illustrate that a rather large quantity of commercially available or commercially introduced polymers purporting to have high temperature resistance have been prepared with the arylmethylene substituent and therefore will be benefitted by the techniques of this invention.

Polybenzyls of the following structure also are greatly benefitted from techniques of the invention. Generally, the polymeric compositions of the invention are solid at room temperature. They are suitable for use as high performance molded articles.

The preferred and illustrative PPA-M heterocyclic polymer to be improved with the compositions of this invention is characterized by high temperature thermal stability, organic solvent resistance, relatively high tensile modulus, tensile strength and ultimate elongations with low shrinkage at high temperatures. They are improved greatly in their high thermal oxidative stability by the techniques of the invention.

Moreover, these PPA-M polymers have relatively high dielectric strengths. These properties have been found by the present inventor and his co-workers to offer outstanding commercial advantages when used as films in flexible circuitry which for example can be used in air bag circuits, light monitoring circuits, telephone circuits, quartz crystal oscillator circuits and the like because of their ability to be soldered.

They also are especially suitable for magnetic tapes (where good dimensional stability at high temperatures is required), for fibers, such as tire cord fibers, where high tenacity and modulus are required, for moldings, for electrical connectors and bearings where high temperatures are required, magnetic wire insulation, coatings for cables, cookware, glass fabrics, industrial belts and the like.

In general, the preferred heterocyclic polymers of the invention will comprise sufficient repeating units of a special heterocyclic ring structure to be solids at room temperature.

The heterocyclic ring will be 5-membered and will contain carbon, and nitrogen linkages wherein at least two of the carbon linkages will be carbonyl groups, i.e., which are separated by a nitrogen atom.

The preferred heterocyclic rings can be schematically represented as wherein X is selected from the group consisting of:

and wherein a minimum of two carbonyl groups are present and separated by a nitrogen atom. Examples of heterocyclic rings which fall in this class are:

Other suitable polymers have repeating units as follows:

or

R=Aromatic containing arylmethylenes wherein Z is a number from 5 to $5 \times 10^3$, preferably 20 to $5 \times 10^2$.

In general, the stabilizers which have been found to be effective are copper, nickel and cobalt salts of inorganic acids and $C_1$ to $C_{30}$, preferably $C_2$ to $C_{20}$, most preferably $C_2$ to $C_{18}$ organic acids. The organic moiety can be aryl, aliphatic or a combination of both. The exact composition is not important, the key requirement being that it contain the metal constituent and be compatible with the polymr composition. Chelates of the copper, nickel and cobalt cations are also included within the scope of the invention.

Cuprous and cupric compounds, especially copper salts of halogens (preferably chlorides, bromides and iodides) and low molecular weight ($C_2$ to $C_8$) organic acids are especially effective stabilizers in the inventive compositions.

All highly brominated phenols, especially with bromine groups ortho to hydroxy groups are effective stabilizers.

Specific preferred species operable in this invention include cupric chloride, cupric bromide, cupric acetyl acetate, nickelous chloride, and cuprous iodide.

Particularly preferred stabilizer species in order of effectiveness are cupric acetate, $CuCl_2$, $CuBr_2$, $CuCl$, $CuBr$, cupric acetylacetonate, pentabromophenol and $CoCl_2$.

Moreover, within the class disclosed, it has been found that several synergistic combinations exist such as the cuprous salts with secondary aromatic amines.

Although there is some art, e.g., U.S. Pat. No. 3,642,906 teaching the utilization of cupric salts in small molecules, the utilization of said salts in this type of polymer has not been contemplated by the art.

Moreover, it is theorized by the current inventor that he has found a means of converting the relatively unstable (arylene carbonyl), which latter is very stable at elevated temperatures.

These stabilizers can be used in quantities of 0.0005 to 2.0 preferably 0.001 to 0.50 and most preferably 0.01 to 0.20 weight percent based on the total weight of the polymer composition.

In any discussion of the degradation and stability of high performance polymers, one must specify not only the different temperature levels within which one wishes to achieve particular results, but one must also specify the particular time of exposure to a temperature level.

Thus, a given polymer can be found to have relatively short stability at a high temperature and a relatively long one at a temperature level considerably below the high one. But there are different levels of requirements. For instance, if one wants to dry a polymer for a relatively short time, the temperatures are quite high for these operations.

As an illustration, for drying operations, one would look at a temperature of 200°-285° C but one would dry at this temperature for only 1-2 hours. By the same token, extrusion temperatures could run from 280°-290° C but would extend for a time period of only 20-40 minutes.

Thus, if one could utilize a high temperature polymer, which had a continuous use temperature of at least 155° C, for short periods of time up to 275°-290° C, one could not only achieve drying and extrusion, but could also utilize the material as a dielectric material, for coatings, for laminating varnishes, as a substrate for flexible circuitry and the like. In fact, whenever only short exposures to relatively high temperatures are expected and required, the compositions of the invention are suitably stabilized.

Under normal circumstances, PPA-M and other comparably high temperature and high performance thermoplastics containing the same oxidizable methylene group have a continuous use temperature of only about 135° C. If such polymers could be stabilized to give continuous use temperatures of 155° C, they would fit within IEEE rating of of class F (continuous use up to 155° C) and would have considerable market potential at a relatively low price as opposed to plastics which currently sell at much higher prices.

If such polymers could be stabilized to achieve a continuous use temperature of 180° C, (IEEE Class H, continuous use up to 180° C), then the market potential would even be greater because of the extremely favorable cost utilization relationship.

In the screening tests which were carried out in order to develop the information which led to the invention here, it was decided to initiate the screening at 200° C since the parabanic acid ring degrades at higher than 200° C. Moreover, if good performance was found at 200° C, one could conclude that it would be excellent at 155° C for continuous use and very likely would perform well at 180° C for continuous use.

In carrying out the experiments, which will be described in detail later herein, in order to develop the invention described herein, novel and unique techniques were developed for not only adding the stabilizers to the resin, but also to actually measure the molecular weight change which ensued after exposing the stabilized polymer to the harsh high temperature conditions.

MEASUREMENT OF MOLECULAR WEIGHT CHANGES

Figure 1:
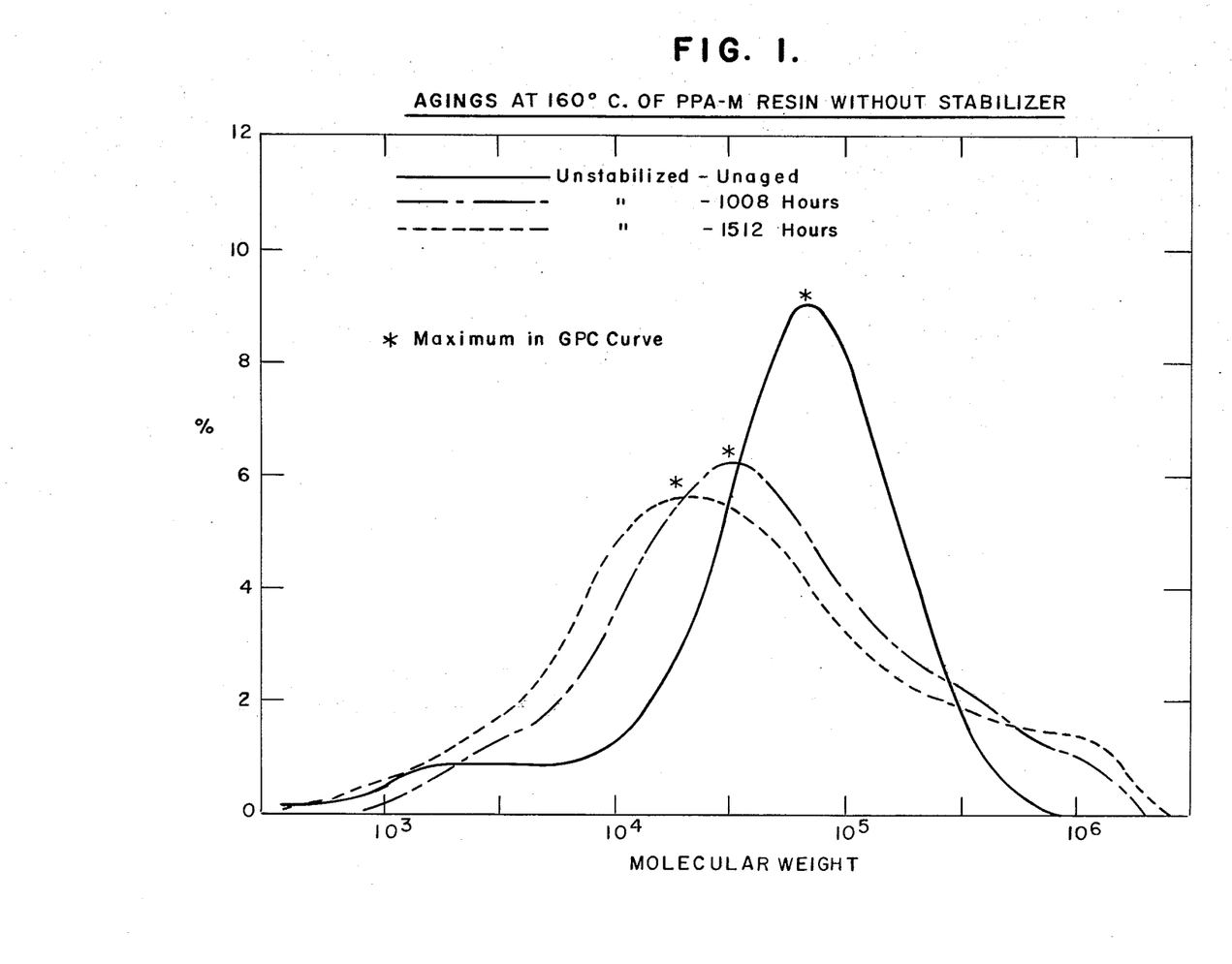

Inherent viscosities measurements are adequate for following molecular weight changes due to either chain scission or crosslinking, but not when both are occurring at the same time as is the case for PPA-M. Previous studies of the stabilities of unstabilized PPA-M resins had confirmed this and had led to the use of GPC, gel permeation chromatography, for this purpose. The use of GPC permits a partial resolution of the chain scission and crosslinking processes and thus is well suited for monitoring the effects of stabilizers on PPA-M. This is illustrated in FIG. 1 where gel permeation chromatograms are shown for the base PPA-M resin, D-4645-26, before aging and after aging up to 1512 hours at 160° C in a recirculating air oven. The movement of the maximum in the molecular weight distribution to a lower value is attributed to chain scission whereas the appearance of species having higher molecular weights than any in the unaged sample is due to crosslinking.

A presentation of the complete GPC traces gives the most information concerning the effectiveness of antioxidants. However, it is very cumbersome to compare a lot of aging data this way. A simple parameter is needed which reflects the degree of MW breakdown and also crosslinking, both of which occur during the oxidative degradation of PPA-M. It may be noted in FIG. 1 that the height of the maximum in the GPC molecular weight distribution curve decreases in a regular way as the extent of crosslinking and MW breakdown increases during aging. Both of these phenomena contribute to the decrease in the maximum. Thus the reduction in the maximum during agings is a convenient parameter with which to compare the effectiveness of antioxidants as a function of aging times and will be used here.

Addition of Stabilizers to the Resin

In previous stabilization work with PPA-M, the stabilizers were added to solutions of the resin in DMF (dimethyl formamide) and film cast therefrom. The films were aged and changes in mechanical properties, such as fold endurance, tensile strength and percent elongation to fail, were used to follow degradation of the film with aging. The advantage of this procedure was that the stabilizers were molecularly dispersed in the film and thus one should obtain the maximum effectiveness of the inhibitor and also the stability of the film is ultimate criterion for success.

On the other hand, mechanical properties do not show marked changes until gross changes in molecular weight have occurred. Thus, long aging times were required before definitive results were obtained, particularly at the lower temperature of interest. Thus, a method of adding the inhibitors directly to the resin was sought.

It was determined that a simple way to do this was to dissolve the inhibitor in a solvent which did not dissolve the resin and to slurry the resin as a powder with the required volume of inhibitor solution and to drive off the solvent leaving the inhibitor with the powdered resin.

The invention is further illustrated by the following examples:

EXAMPLE 1

The technique described above for measuring molecular weight changes and the method of incorporating stabilizers in the resin were utilized with respect to various levels of $CuCl_2$ along and in combination with octabromobiphenyl, OBBP, the preferred flame retardant for PPA-M, and these were compared to a PPA-M polymer with no stabilizer. The results are summarized in FIG. 2 showing the effect of $CuCl_2$ and omission of $CuCl_2$ at 200° C.

It will be seen from these figures that the presence of very small quantities of $CuCl_2$ effect significant benefits for long term heat aging stabilization and that $CuCl_2$ would be an effective stabilizer in PPA-M compositions containing OBBP as a flame retardant.

Incidently, it should be noted that all experiments referred to herein correlated very well with those for PPA-M and other comparative polymers in film form, the film having a thickness of about two (2) mils.

EXAMPLE 2

Figure 4:
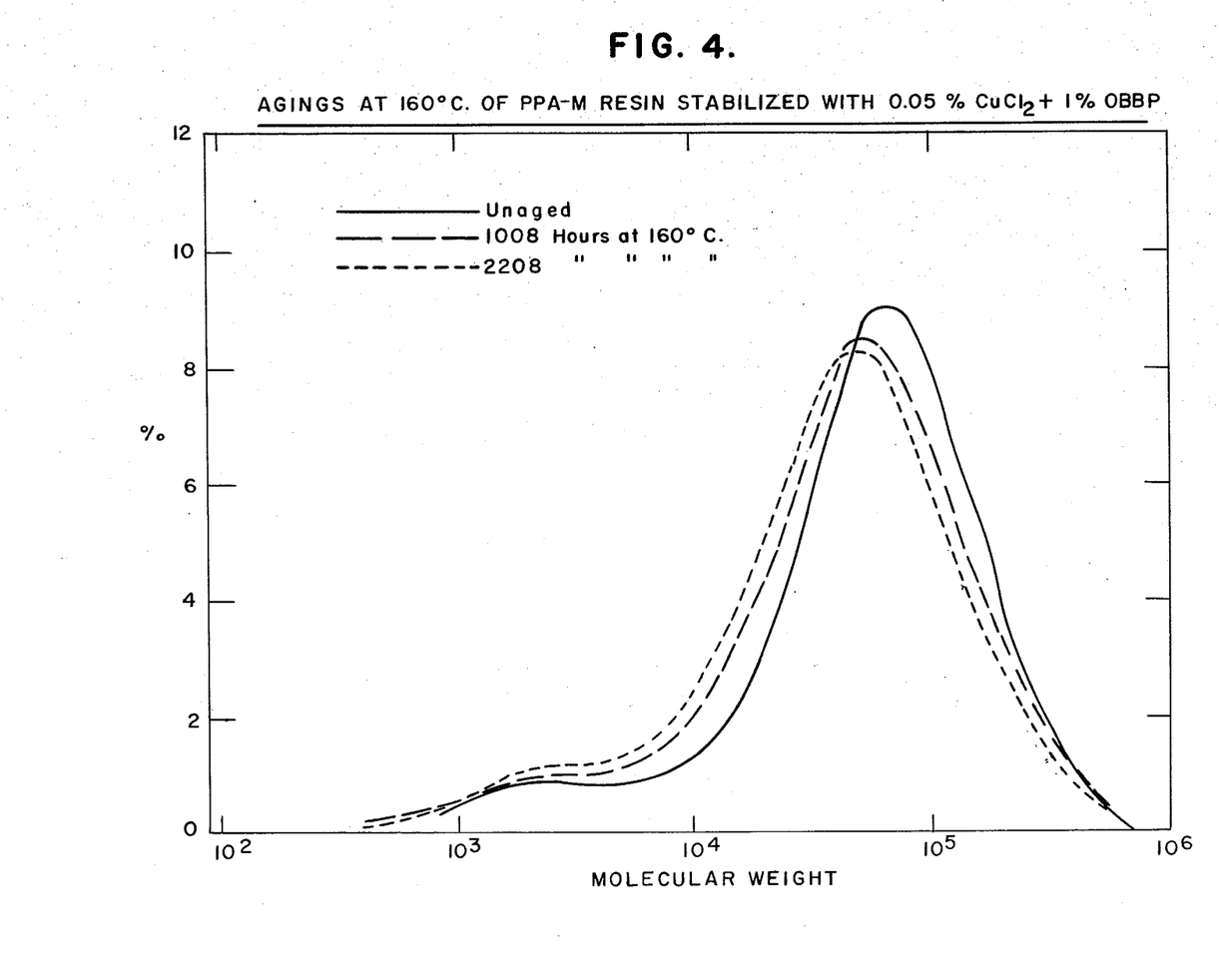

This example was carried out with the techniques described above in the balance of the specification and also in Example 1 utilizing cupric chloride at 160° C and also comparing these with PPA-M which had not been stabilized at all. The results are summarized in FIG. 3. As can be seen by the Figure, $CuCl_2$ which performed well at 200° C also performed well at 160° C as postulated. Moreover, it can be seen that unstabilized PPA-M was badly degraded after 1500 hours, whereas when stabilized with $CuCl_2$, there was very little degradation after 2200 hours of aging. This is further illustrated for one of the stabilized resins in FIG. 4 which portrays the GPC traces for the aged and unaged resins. It is apparent that the molecular weight distribution has not been severely altered even after 2208 hours at 160° C.

The possibilities are that one will be able to achieve 10,000 hours on the stabilized resin. This may well be adequate to obtain a continuous use temperature of 155° C for stabilized film.

EXAMPLE 3

Figure 5:
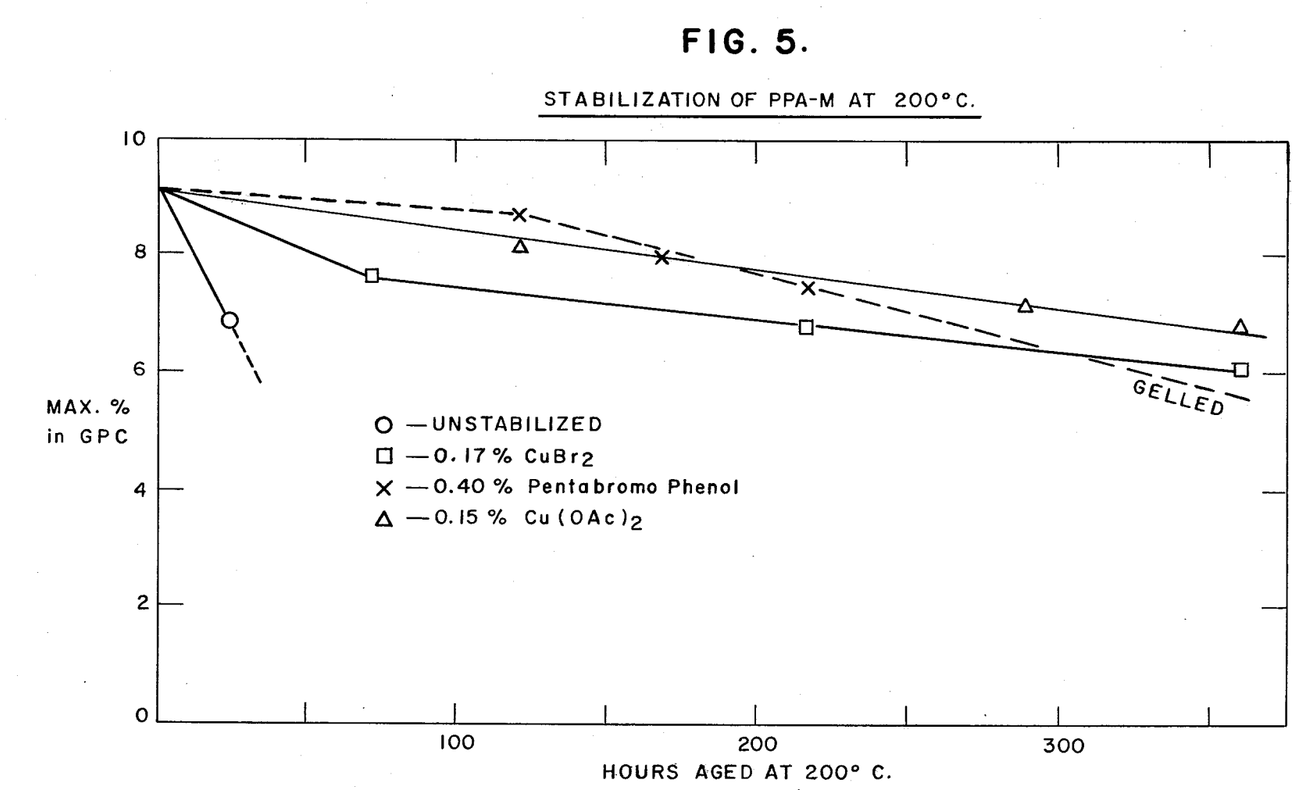

$CuBr_2$, cupric acetate and pentabromophenol were added to PPA-M resin as described above. The resins so stabilized were aged in a recirculating air oven at 200° C for up to 360 hours. The results are given in FIG. 5. All three greatly increased the oxidative stability relative to the unstabilized resin.

EXAMPLE 4

The group of antioxidants found to be the most effective at 200° C for PPA-M were evaluated at 160° C. The results are given in Table I. All improved the oxidative stability of PPA-M with the copper compounds being the most effective.

Table I

| A Summary of Stabilization of PPA-M at 160° C | | | |
|---|---|---|---|
| Stabilizer | Wt % | Aging Time (Hrs) | Maximum % in GPC |
| None | — | 1500 | 5.6 |
| $CuCl_2$ | 0.10 | 1500 | 8.4 |
| $CuCl_2$ | 0.10 | 2000 | 7.9 |
| $CuBr_2$ | 0.17 | 2000 | 7.8 |
| $Cu(OAc)_2$ | 0.15 | 2000 | 7.9 |
| Cupric Acetyl-acetonate | 0.19 | 2000 | 8.0 |
| $CoCl_2$ | 0.10 | 2000 | 7.1 |
| $NiCl_2$ | 0.10 | 2000 | 6.5 |

EXAMPLE 5

Another type of PPA is prepared with an ether, i.e., —O— linkage instead of a methylene linkage. This is designated as PPA-E and is schematically illustrated by the following formula.

For comparison purposes, this polymr was subjected to high temperatures in order to ascertain the types and varieties of reaction that the polyparabanic acid ring would undergo at high temperature when there was no methylene group or any other potentially unstable structure except the ring itself. Accordingly, this polymer, following the techniques described above, was aged at 200° C in air. The results are summarized in FIG. 6.

Figure 6:
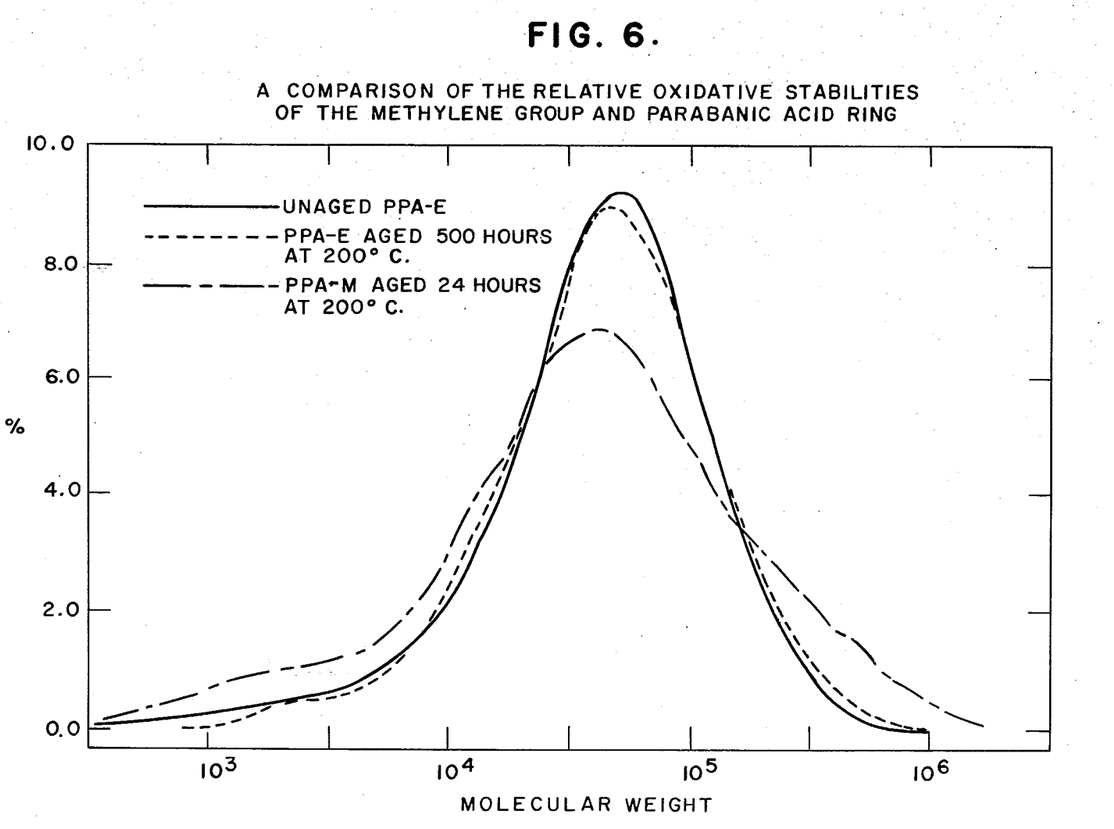

It can be seen from these figures that the PPA ring is thermally and oxidatively stable up to 200° C. Thus, if one can effectively stabilize the methylene group, one should be able to obtain a PPA-M which will be stable up to about 200° C.

EXAMPLE 6

In order to ascertain whether the degradation reaction of PPA-M is due simply to heat alone or whether oxygen plays any role, PPA-M following the techniques described above were exposed to a temperature of 200° C in an inert nitrogen atmosphere and this was compared to the identical procedure in an oxygen atmosphere. The results are summarized in FIG. 7.

Figure 7:
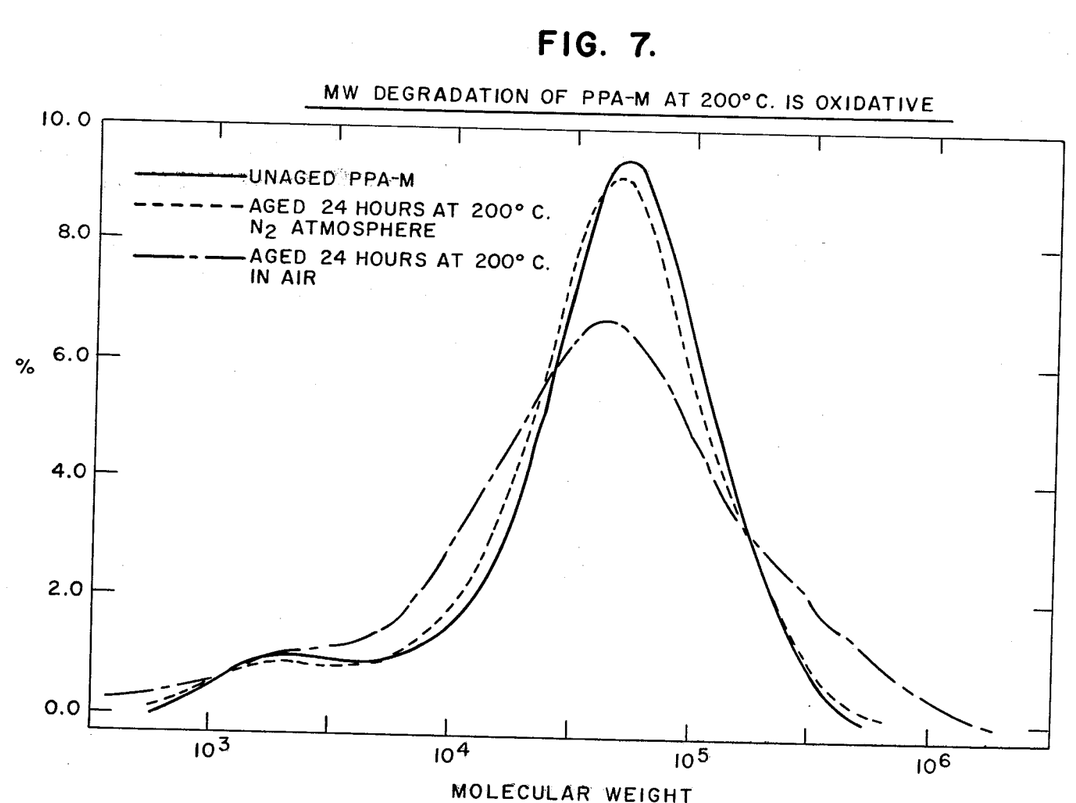

It can be seen that essentially no degradation occurred in the inert atmosphere whereas both chain scission and crosslinking occurred in air. Thus, it can be reasonably concluded that the degradation reactions of the methylene group at around 200° C are of the oxidative type.

Another manner of increasing the physical properties of PPA film is to irradiate the film under certain conditions.

Actual electron irradiation of PPA-M film was performed by Radiation Dynamics, Inc., Westbury, Long Island, New York. The electron energy was $1.3 \times 10^6$ electron volts. The results are given in Table II. Comparing non-irradiated with the film receiving the maximum dosage, 100 megarads, it is apparent that electron irradiation at this level does not degrade PPA-M and in fact improves the toughness. This is exemplified by the elongation to break which increased from 29% to 115%. Even tear strength was modestly improved. PPA-E will respond in a like manner.

Table II

| Properties of Electron Irradiated PPA-M Film | | | | |
|---|---|---|---|---|
| Dosage (megarads) | 0 | 30 | 70 | 100 |
| Tensile Strength (kg/cm²) | 1040 | 1020 | 1175 | 1310 |
| Elongation to Break, % | 29 | 27 | 88 | 114.6 |
| Tensile Modulus (kg/cm²) | 23,500 | 24,100 | 24,300 | 22,200 |
| Tear Strength, Propagating (kg/cm) | 3.1 | 3.1 | 3.4 | 3.7 |

Metals in the form of salts, complexes, etc. which are effective as oxidative stabilizers for PPA-M are those from Group IB (copper, silver and gold), Group IVB (titanium, zirconium and hafnium), Group VB (vanadium, niobium and tantalum), Group VIB (chromium, molybdenum and tungsten), Group VIIB (manganese and rhenium) and Group VIII (iron, ruthenium, osmium, cobalt, rhodium, irridium, nickel, palladium and platinum). The Group designation refers to that of a standard Periodic Table.

These metals are effective as salts of mineral acids, such as HCl, HBr, HI, $H_2SO_4$, $H_3PO_4$, and $HNO_3$, organic acids such as $C_1$ to $C_{30}$ carboxylic acids, sulfonic acids and derivatives thereof.

Chelate compounds of these metals are effective. Examples of such chelating agents are dicarboxylic acids, e.g. malonic acid; diamines, e.g., ethylenediamine and o-phenanthroline; amino acids, e.g., ethylenediamine tetra acetic acid; hydroxy acids, e.g. citric acid; phosphates, e.g., pyrophosphoric acid; nitro acids, e.g., nitroacetic acid; hydroxy aldehydes, e.g., salicylaldehyde; β-diketones, e.g., acetylacetonates; phenols, e.g., 3-hydroxyquinoline and keto esters, e.g., ethylacetoacetate.

The metal compounds can be used alone or in combination with synergistic compounds which by themselves are not effective stabilizers. Examples of cosynergizers are LiX, NaX, and KX where X = Cl, Br, I. These alkali metal halogen salts form complexes with $CuX_2$, X=Cl, Br, I, which in combination are very effective stabilizers. Certain tin compounds, e.g. $SnCl_2$, can be used with enhanced effectiveness in combination with copper compounds such as $CuX_2$, X=Cl, Br, I.

What is claimed is:

1. A stabilized high performance, high temperature resistant solid polymeric composition comprising:
   a. a major portion of a high performance polymer having aryl methylene groups;
   b. a minor amount, sufficient to substantially increase the high temperature oxidative stability of said polymer, of a compound selected from the group consisting of
   cupric acetate, cuprous chloride, cuprous bromide, cobaltus chloride, cupric chloride, cupric bromide, nickelous chloride, cuprous iodide and mixtures thereof.

2. A composition according to claim 1 wherein said polymer is derived from a precursor containing a diphenyl methane radical.

3. A composition according to claim 1 wherein said polymer is selected from the group consisting of polyhydantoins, polyimides, andd combinations thereof.

4. A composition according to claim 1 wherein said stabilizer is present in quantities of 0.0005 to 2.0 weight percent based on the overall composition.

5. The composition of claim 1 wherein said arylmethylene groups are methylene monoarylene groups.

6. The composition of claim 1 wherein said arylmethylene groups are methylene diarylene groups.

7. A stabilized high performance, high temperature resistant polymeric composition comprising:
   a. a major portion of a high performance polymer having at least one repeating unit which is represented as and
   b. an effective amount, sufficient to substantially increase the high temperature oxidative stability of said polymer, of a compound selected from the group consisting of
      i. copper, nickel and cobalt salts of inorganic acids and $C_1$ to $C_{30}$ organic acids;
      ii. copper, nickel and cobalt chelates;
      iii. combinations of the foregoing.

8. A composition according to claim 7 wherein said stabilizer is present in quantities of 0.0005 to 2.0 weight percent based on the overall composition.

9. The composition of claim 7 wherein said stabilizer is cupric acetate.

10. The composition of claim 7 wherein said stabilizer is cuprous chloride.

11. The composition of claim 7 wherein said stabilizer is cuprous bromide.

12. The composition of claim 7 wherein said stabilizer is cobaltus chloride.

13. The composition of claim 7 wherein said stabilizer is cupric chloride.

14. The composition of claim 7 wherein said stabilizer is cupric bromide.

15. The composition of claim 7 wherein said stabilizer is cupric acetylacetonate.

16. The composition of claim 7 wherein said stabilizer is nickelous chloride.

17. The composition of claim 7 wherein said stabilizer is cuprous iodide.

* * * * *